(12) United States Patent
Hage-Hassan et al.

(10) Patent No.: US 8,998,331 B2
(45) Date of Patent: Apr. 7, 2015

(54) VEHICLE SEAT

(71) Applicant: TS Tech Co., Ltd., Saitama (JP)

(72) Inventors: Souheil Hage-Hassan, Reynoldsburg, OH (US); Eiji Toba, Reynoldsburg, OH (US)

(73) Assignee: TS Tech Co., Ltd., Saitama (JP)

( * ) Notice: Subject to any disclaimer, the term of this patent is extended or adjusted under 35 U.S.C. 154(b) by 161 days.

(21) Appl. No.: 13/731,328

(22) Filed: Dec. 31, 2012

(65) Prior Publication Data

US 2014/0183920 A1 Jul. 3, 2014

(51) Int. Cl.
*B60N 2/20* (2006.01)

(52) U.S. Cl.
CPC ........................................ *B60N 2/20* (2013.01)

(58) Field of Classification Search
USPC ................... 297/344.1, 344.14, 344.15, 378.1
See application file for complete search history.

(56) References Cited

U.S. PATENT DOCUMENTS

| | | | | |
|---|---|---|---|---|
| 4,484,776 | A * | 11/1984 | Gokimoto et al. | 296/65.09 |
| 5,531,503 | A * | 7/1996 | Hughes | 297/341 |
| 6,048,030 | A * | 4/2000 | Kanda et al. | 297/341 |
| 6,641,218 | B2 * | 11/2003 | Ito et al. | 297/378.12 |
| 6,793,285 | B1 * | 9/2004 | Tame | 297/336 |
| 6,883,854 | B2 * | 4/2005 | Daniel | 296/65.03 |
| 7,017,993 | B2 * | 3/2006 | Niimi et al. | 297/341 |
| 8,388,065 | B2 * | 3/2013 | Harden | 297/317 |
| 8,439,443 | B2 * | 5/2013 | Nakane et al. | 297/378.12 |
| 2006/0181133 | A1 * | 8/2006 | Sugama et al. | 297/378.1 |
| 2014/0110986 | A1 * | 4/2014 | Yamaguchi et al. | 297/378.1 |

FOREIGN PATENT DOCUMENTS

| | | |
|---|---|---|
| JP | H01-123736 U | 8/1989 |
| JP | 11-301318 A | 11/1999 |
| JP | 2001-130296 A | 5/2001 |
| JP | 2003-531767 A | 10/2003 |
| JP | 2005-313745 A | 11/2005 |
| JP | 2006-264347 A | 10/2006 |
| JP | 2007-196741 A | 8/2007 |
| JP | 2009-202813 A | 9/2009 |
| JP | 2011-245990 A | 12/2011 |

OTHER PUBLICATIONS

International Search Report issued for PCT/JP2013/085236 (Mar. 18, 2014).

* cited by examiner

*Primary Examiner* — David R Dunn
*Assistant Examiner* — Timothy J Brindley
(74) *Attorney, Agent, or Firm* — Drinker Biddle & Reath LLP

(57) ABSTRACT

Provided is a seat structure minimizes a size of a vehicle seat in which a rotation body rotates by being pressed by a seat back in interlocking a driving unit with the seat back. In a seat including a link mechanism which interlocks a driving unit with a seat back tilted toward a seat cushion, the back and cushion are connected to each other by a bracket at the side of the back and cushion in the vehicle width direction, and a transmission member which rotates to interlock the driving unit with the seat back is provided. The transmission member is adjacent to the bracket in the vehicle width direction and rotates by being pressed by the seat back tilted toward the seat cushion, and a portion pressed by the seat back in the transmission member is positioned outside compared to an outer edge of the connection bracket.

9 Claims, 15 Drawing Sheets

FRONT ⟵⟶ REAR

INSIDE ⟵⟶ OUTSIDE
WIDTH DIRECTION

VEHICLE SEAT

BACKGROUND

Disclosed herein is a vehicle seat including a seat cushion and a seat back that rotates relative to the seat cushion, and particularly, to a vehicle seat including a link mechanism that interlocks another movable member with the seat cushion when it is rotating.

There are well known vehicle seats including a seat cushion and a seat back that rotate relative to the seat cushion, and among such vehicle seats, there is known a seat including a link mechanism for interlocking another movable member such as a seat cushion position adjusting mechanism with the seat back when it is rotating. Further, some of such vehicle seats including the link mechanism further include a rotation body that rotates to interlock the another movable member with the seat cushion, as a component. In the vehicle seat with such a configuration, the aforementioned rotation body rotates in a predetermined direction by being pressed by the rotating seat back. The rotation body is connected to the another movable member by a wire or a gear set. For this reason, when the rotation body rotates, the rotation thereof is used as a driving force and thus the another movable member is driven.

An exemplary configuration which has been devised for supporting the aforementioned rotation body in the vehicle seat is a configuration in which a shaft is provided in a plate member connecting a side surface of a seat cushion to a side surface of a seat back and the rotation body is rotatably supported by the shaft (for example, see Japanese Patent Document No. H01-123736 ("the '736 Document").

In the configuration disclosed in the '736 Document, the side surface of the seat back is provided with a protrusion and a through-hole is formed along the rotation track of the seat back in the plate member. The protrusion which is provided in the side surface of the seat back is engaged with the through-hole, and is disposed in a state where the front end portion thereof slightly protrudes from the through-hole. When the seat back rotates in such a state, the protrusion which is provided in the side surface of the seat back moves along the through-hole formed in the plate member, and halfway through the movement, abuts against the rotation body. Subsequently, when the seat back further rotates and the protrusion moves toward one end portion of the through-hole, the front end portion of the protrusion is pressed against the rotation body. As a result, the rotation body rotates in the same direction while being interlocked with the seat back.

However, in the configuration disclosed in the '736 Document, in order to transmit the rotation of the seat back to the rotation body, the side surface of the seat back is provided with the protrusion and the protrusion is engaged with the plate member connecting the side surface of the seat cushion to the side surface of the seat back. That is, since the plate member is provided with the through-hole, the size of the plate member increases because of the installation space of the through-hole. As a result, the size of the vehicle seat increases. The size increase of the vehicle seat decreases the degree of freedom of the seat installation position inside the vehicle and affects the manufacturing cost.

SUMMARY

Therefore, in view of the aforementioned problems, a seat structure is provided capable of suppressing the size increase of a vehicle seat which includes a rotation body that rotates by being pressed by a seat back to interlock another movable member with the seat back when it is rotating.

The aforementioned problems are solved by a vehicle seat including a seat cushion, a seat back which rotates relative to the seat cushion, and a link mechanism which interlocks another movable member with the seat back that rotates in a tilting direction toward the seat cushion; in which the seat back and the seat cushion are connected to each other by a connection member disposed at the side of the seat back and the seat cushion in the width direction of the vehicle seat, the link mechanism includes a rotation body which rotates to interlock the another movable member with the seat back when it rotates in the tilting direction toward the seat cushion, the rotation body is adjacent to the connection member in the width direction and rotates by being pressed by the seat back when it rotates in the tilting direction toward the seat cushion, and a portion pressed by the seat back in the rotation body is positioned outside of an outer edge of the connection member when seen from the width direction.

In the vehicle seat, the rotation body is pressed by the seat back outside the outer edge of the connection member that connects the seat back to the seat cushion. Accordingly, there is no need to provide the through-hole which has been necessary for the case where the seat back presses the rotation body inside the outer edge of the connection member. Accordingly, the connection member may have a further reduced size since the through-hole is not provided therein. Therefore, in the aforementioned configuration, it is possible to effectively suppress the size increase of the vehicle seat.

Further, in the aforementioned configuration, the rotation body may include a first wall portion which is disposed along an outer surface of the connection member provided outside thereof in the width direction and a second wall portion which extends from a position adjacent to the outer edge of the first wall portion toward the outer surface, a portion pressed by the seat back in the rotation body may be provided in the second wall portion, and the second wall portion may be provided at least at a position adjacent to a portion surrounding a rotation shaft of the rotation body in the outer edge of the first wall portion.

In the aforementioned configuration, since the vicinity of the portion pressed by the seat back in the rotation body is bent, the rigidity thereof is relatively high. In this way, since the rigidity of the portion pressed by the seat back is relatively high, the rotation body may stably be pressed by the seat back. Further, since the second wall portion is provided to be adjacent to a portion positioned around the rotation shaft of the rotation body in the outer edge of the first wall portion, the rotation body may satisfactorily rotate. As a result, it is possible to appropriately transmit the rotation of the seat back to the another movable member.

Further, in the aforementioned configuration, the rotation body may have a bent shape when seen from the width direction. In this case, particularly, a center portion of the rotation body may be supported by the rotation shaft of the rotation body, one end portion of the rotation body may include a portion pressed by the seat back in the rotation body, a relay member which is laid down to connect the rotation body to the another movable member may be attached to the other end portion of the rotation body, and in a state where the rotation body is not pressed by the seat back, one end portion and the other end portion of the rotation body may be positioned upstream of the center portion in the direction into which the relay member is drawn when the relay member is attached to the other end portion of the rotation body.

In the aforementioned configuration, it is possible to decrease the size of the vehicle seat compared to the case where the rotation body is not formed in a bent shape, that is, the case where the rotation body has a linear shape. Specifically, when the rotation body is bent, the track (more specifically, the area where the rotation body passes) formed when the rotation body rotates is smaller than that when the rotation body has a linear shape. Accordingly, when the rotation body is bent, the space which needs to be ensured for the rotation of the rotation body is smaller than that when the rotation body has a linear shape, and hence the size of the vehicle seat may further be reduced.

Further, in the aforementioned configuration, a portion pressed by the seat back in the rotation body may be included in one end portion of the rotation body, one end portion of the rotation body may protrude outward compared to the outer edge of the connection member when seen from the width direction, the connection member may include an outer surface which is provided outside in the width direction and a connection member side extension portion which extends from a position adjacent to an outer edge of the outer surface outward in the width direction, the connection member side extension portion may be provided along the outer edge of the outer surface, and in the outer edge of the outer surface, the connection member side extension portion may be notched in at least a part of a range where one end portion of the rotation body passes when the rotation body rotates.

In the aforementioned configuration, in the outer edge of the outer surface of the connection member, the connection member side extension portion does not exist in the range where one end portion of the rotation body passes when the rotation body rotates. Accordingly, it is possible to effectively prevent a situation where the connection member side extension portion unexpectedly collides against the rotation body to disturb the rotation of the rotation body.

Further, in the aforementioned configuration, a center portion of the rotation body may be supported by a rotation shaft of the rotation body, a biasing member which biases the rotation body toward the direction opposite to the direction in which the seat back rotates in the tilting direction toward the seat cushion and presses the rotation body may be attached to one end portion of the rotation body, and a relay member which is laid down to connect the rotation body to the another movable member may be attached to the other end portion of the rotation body.

With the aforementioned configuration, since the biasing member that biases the rotation body and the relay member connecting the rotation body to the another movable member are attached to the opposite end portions to each other in the rotation body, the respective members may reasonably be arranged. In particular, the space around the rotation body may effectively be used.

Further, in the aforementioned configuration, the seat back may include a projecting portion which projects outward in the width direction, the projecting portion may move to an abutting position against the rotation body and press the rotation body when the seat back rotates in the direction to be tilted toward the seat cushion, the connection member may include an outer surface which is provided outside in the width direction and a connection member side extension portion which extends from a position adjacent to an outer edge of the outer surface outside in the width direction, and a part of the connection member side extension portion may be positioned at a front end portion of a movement range of the projecting portion and may abut against the projecting portion to regulate further rotation of the seat back in the tilting direction toward the seat cushion.

In the aforementioned configuration, there is no need to additionally provide a component for regulating the rotation amount of the seat back, and the structure for regulating the rotation of the seat back may further be simplified.

Further, in the aforementioned configuration, the connection member may include an outer surface which is provided outside in the width direction and a connection member side extension portion which extends from a position adjacent to an outer edge of the outer surface outward in the width direction, and a holding portion which holds a relay member laid down to connect the rotation body to the another movable member may be formed by notching a part of the connection member side extension portion.

In the aforementioned configuration, there is no need to additionally provide a component for holding the relay member, and the structure for holding the relay member may further be simplified.

Further, in the aforementioned configuration, by jointing the connection member to a reclining mechanism provided between the connection member and the seat back in the width direction, the connection member is attached to the seat back through the reclining mechanism, the connection member and the reclining mechanism are jointed to each other at least at three or more jointing places therebetween when seen from the width direction, and a rotation shaft of the rotation body may be disposed in an area surrounded by the jointing places when seen from the width direction.

In the aforementioned configuration, the rigidity of the portion surrounded by the jointing places to the reclining mechanism in the connection member is higher than those of other portions. In this way, since the rotation shaft of the rotation body is provided in the portion of which rigidity is increased, it is possible to further stabilize the state where the rotation body is supported.

DETAILED DESCRIPTION

Hereinafter, a vehicle seat according to an embodiment of the present invention (hereinafter, also referred to as "this embodiment") will be described with reference to the drawings.

Figure 1:
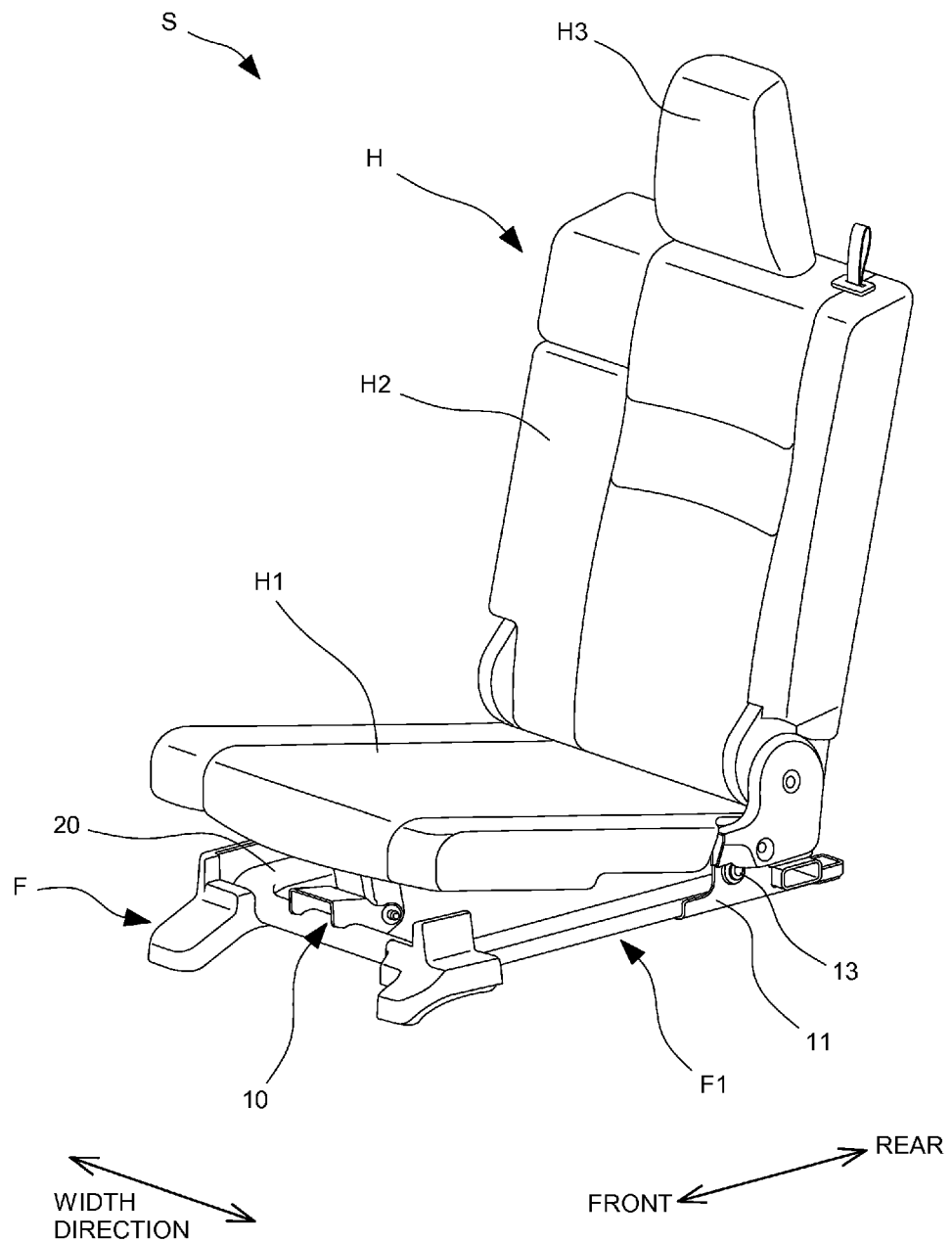
FIG. 1 is a perspective view diagram illustrating an appearance of a vehicle seat according to an embodiment of the present invention.
Figure 2:
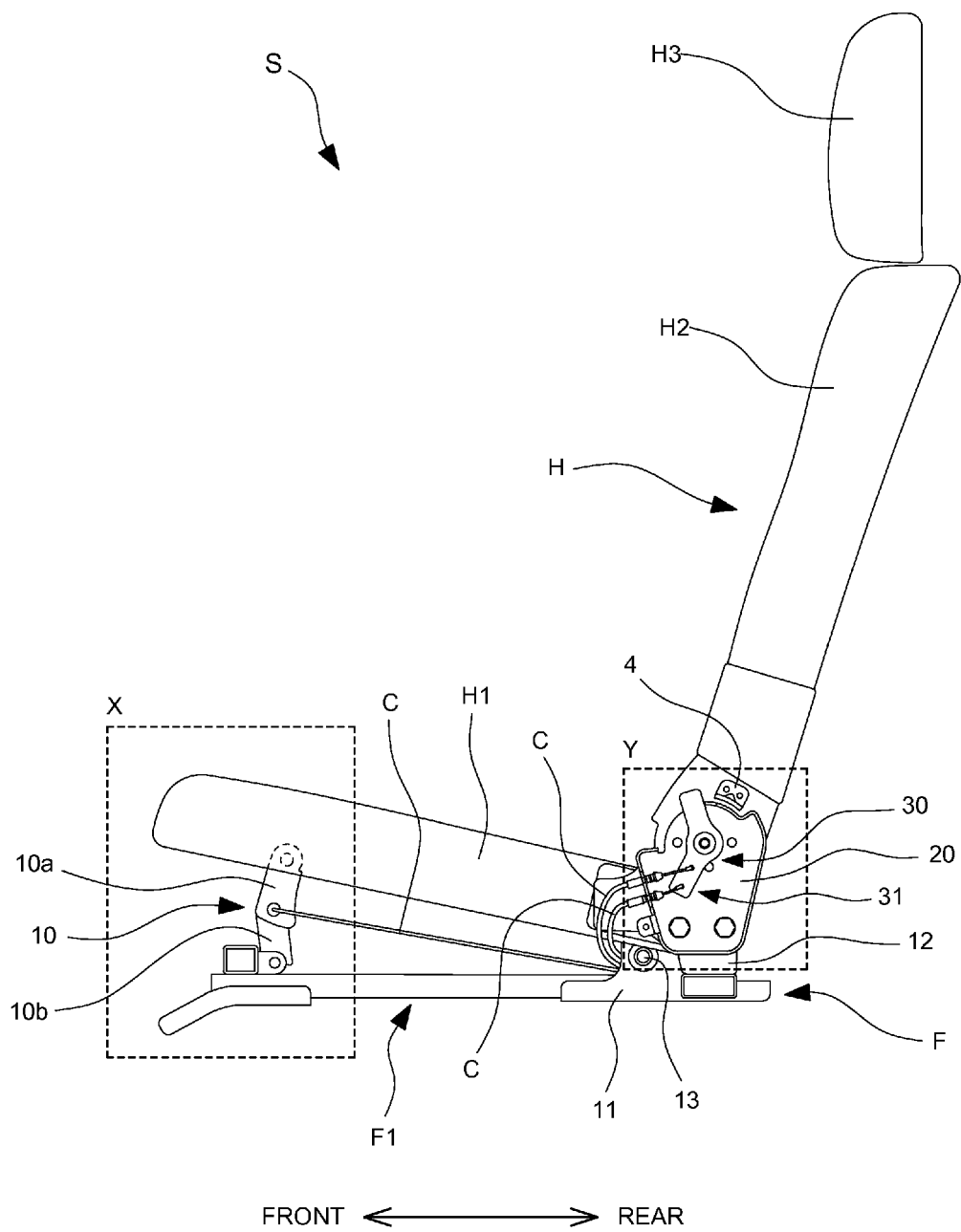
FIG. 2 is a side view diagram illustrating the vehicle seat in the upright state.
Figure 3:
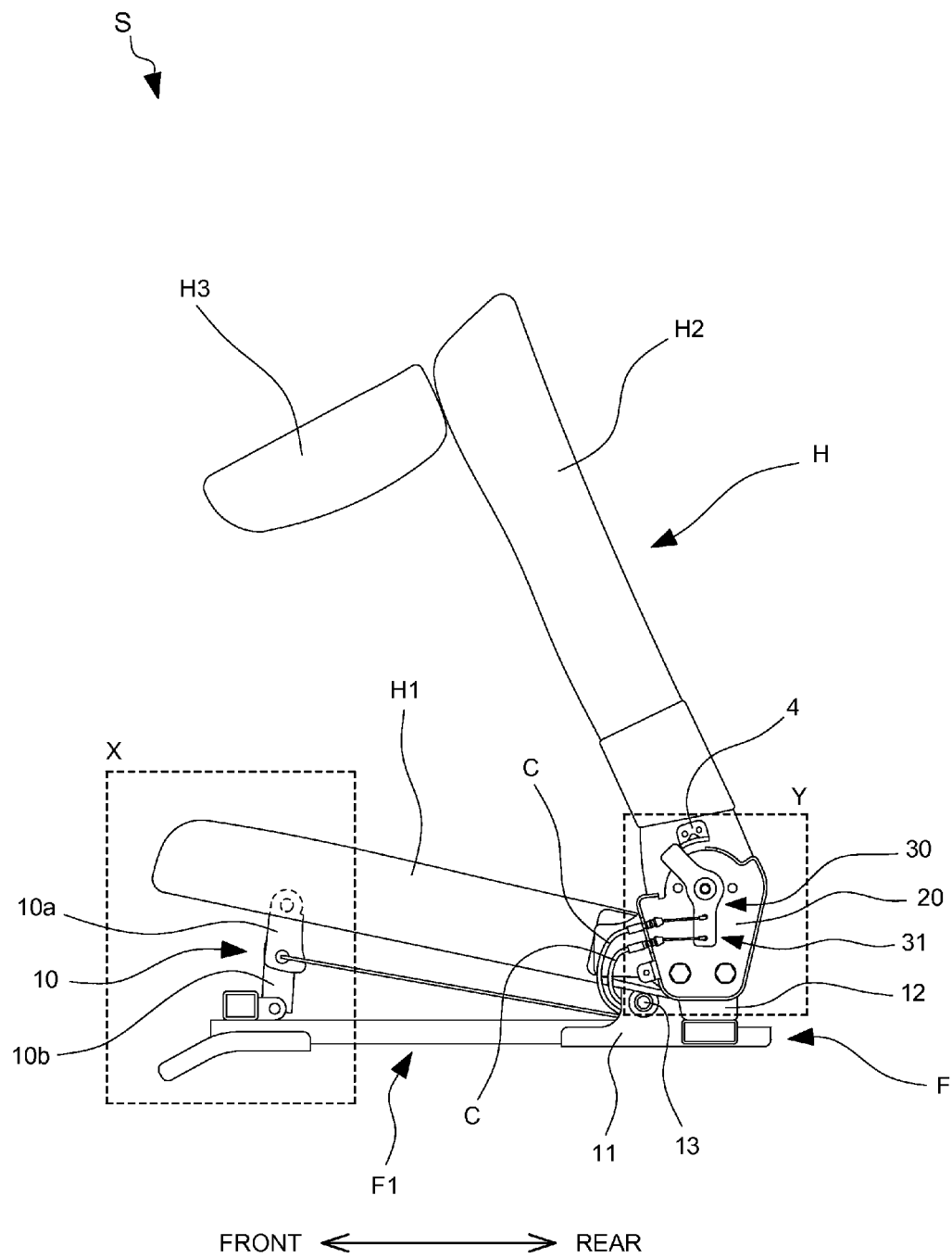
FIG. 3 is a side view diagram illustrating a state on the way to stowage.
Figure 4:
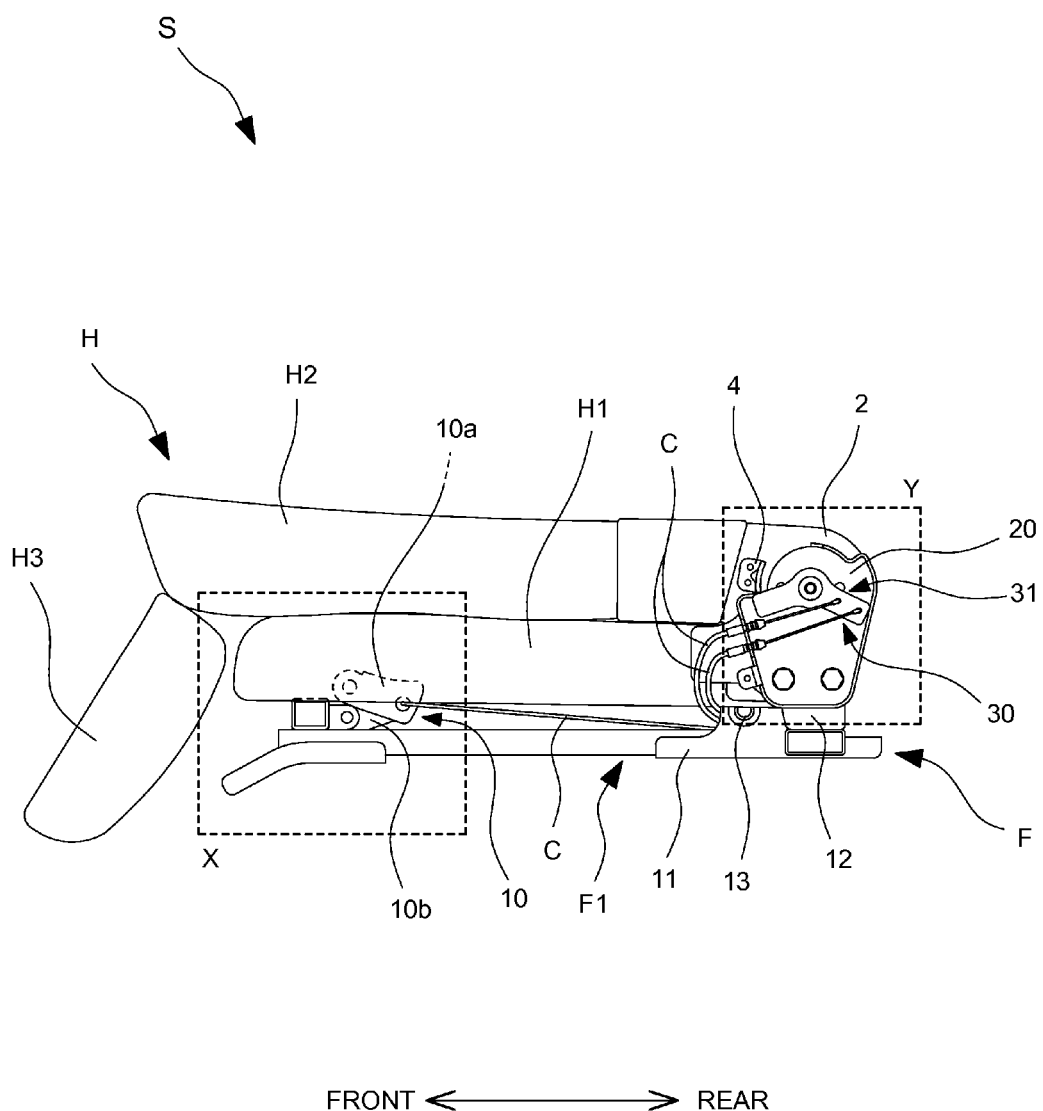
FIG. 4 is a side view diagram illustrating the vehicle seat in the stowage state.

FIG. 1 is a diagram illustrating an appearance of a vehicle seat according to an embodiment. FIGS. 2 to 4 are diagrams illustrating an example of a stowage operation of the vehicle seat according to the embodiment. Specifically, FIG. 2 is a diagram illustrating the vehicle seat in the upright state, FIG. 3 is a diagram illustrating a state on the way to stowage, and FIG. 4 is a diagram illustrating the vehicle seat in the stowage state.

Figure 5:
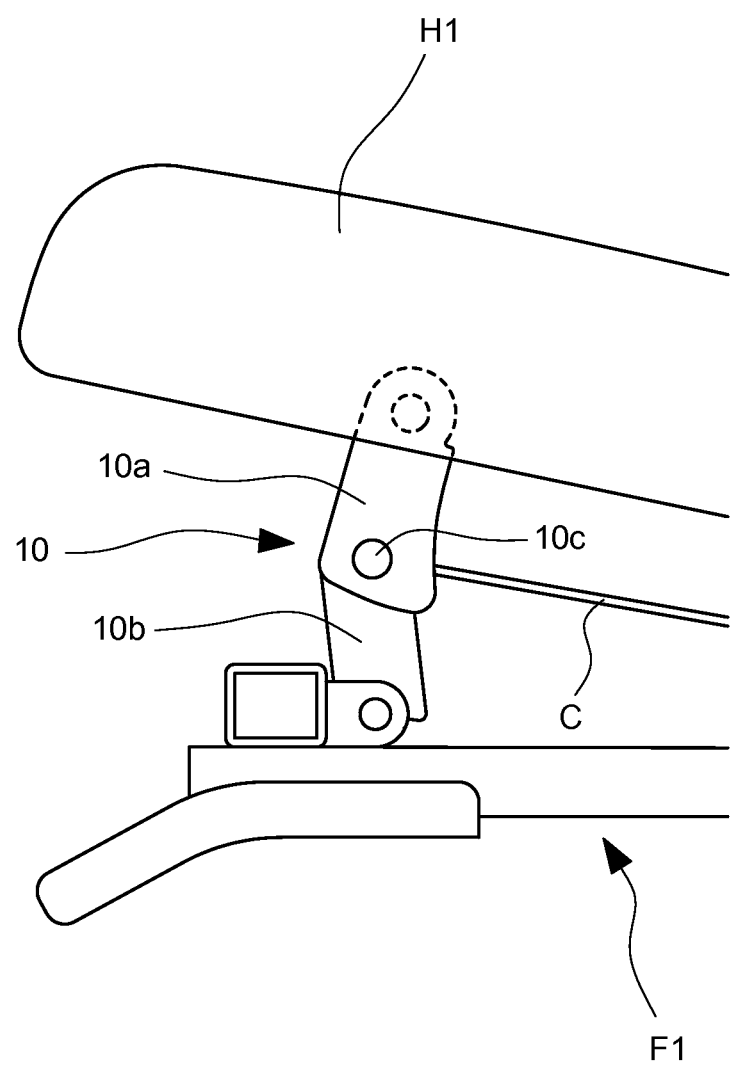
FIG. 5 is a side view diagram illustrating a state before a driving mechanism of a seat cushion is operated.
Figure 6:
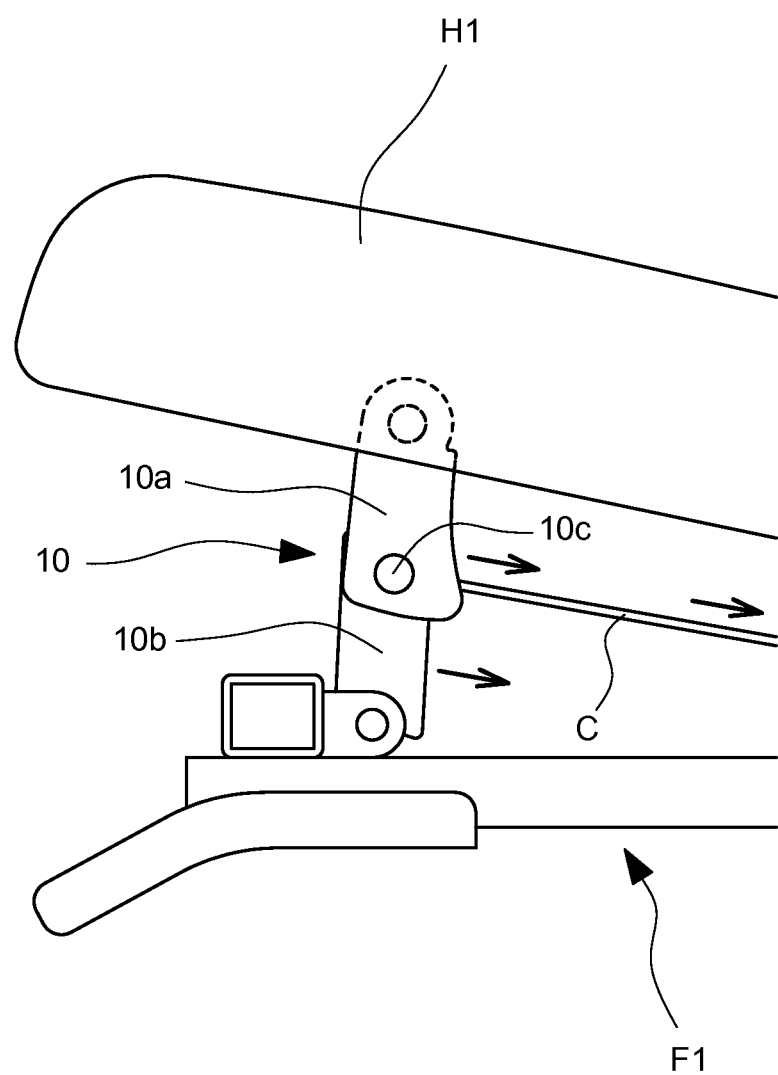
FIG. 6 is a side view diagram illustrating a state where the driving mechanism of the seat cushion is in operation.
Figure 7:
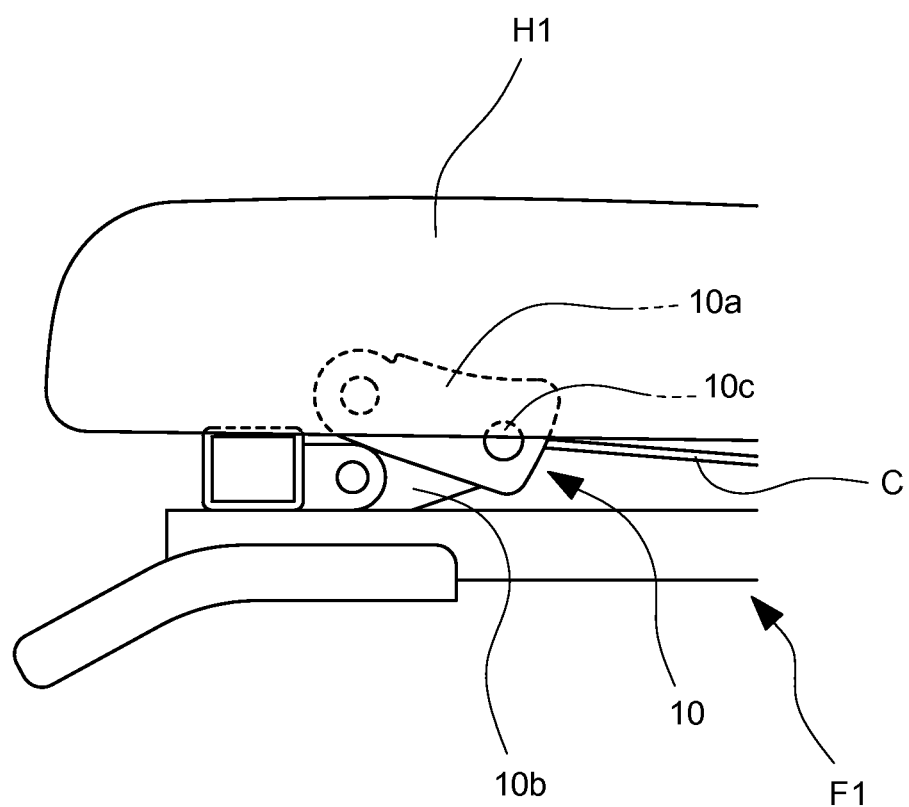
FIG. 7 is a side view diagram illustrating a state where the operation of the driving mechanism of the seat cushion is completed.

FIGS. 5 to 7 are diagrams illustrating an operation example of a driving mechanism which drives a seat cushion upon stowage of the vehicle seat. Specifically, FIG. 5 is a diagram illustrating a state before a driving mechanism of the seat cushion is operated and is an enlarged view of the range X in FIG. 2. FIG. 6 is a diagram illustrating a state where the driving mechanism of the seat cushion is in operation and is an enlarged view of the range X in FIG. 3. FIG. 7 is a diagram illustrating a state where the operation of the driving mechanism of the seat cushion is completed and is an enlarged view of the range X in FIG. 4.

Figure 8:
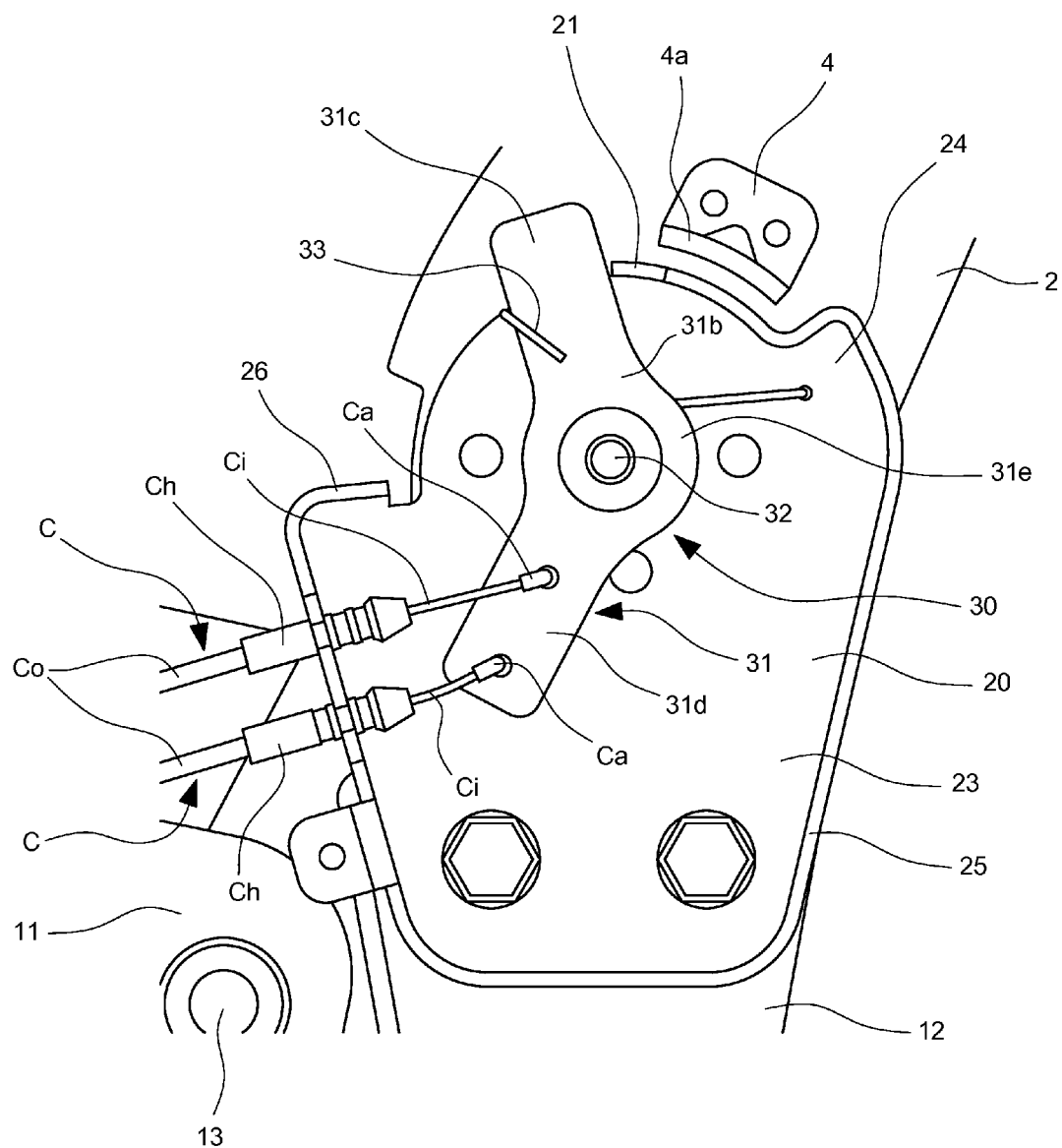
FIG. 8 is a side view diagram illustrating a state before a link mechanism is operated.
Figure 9:
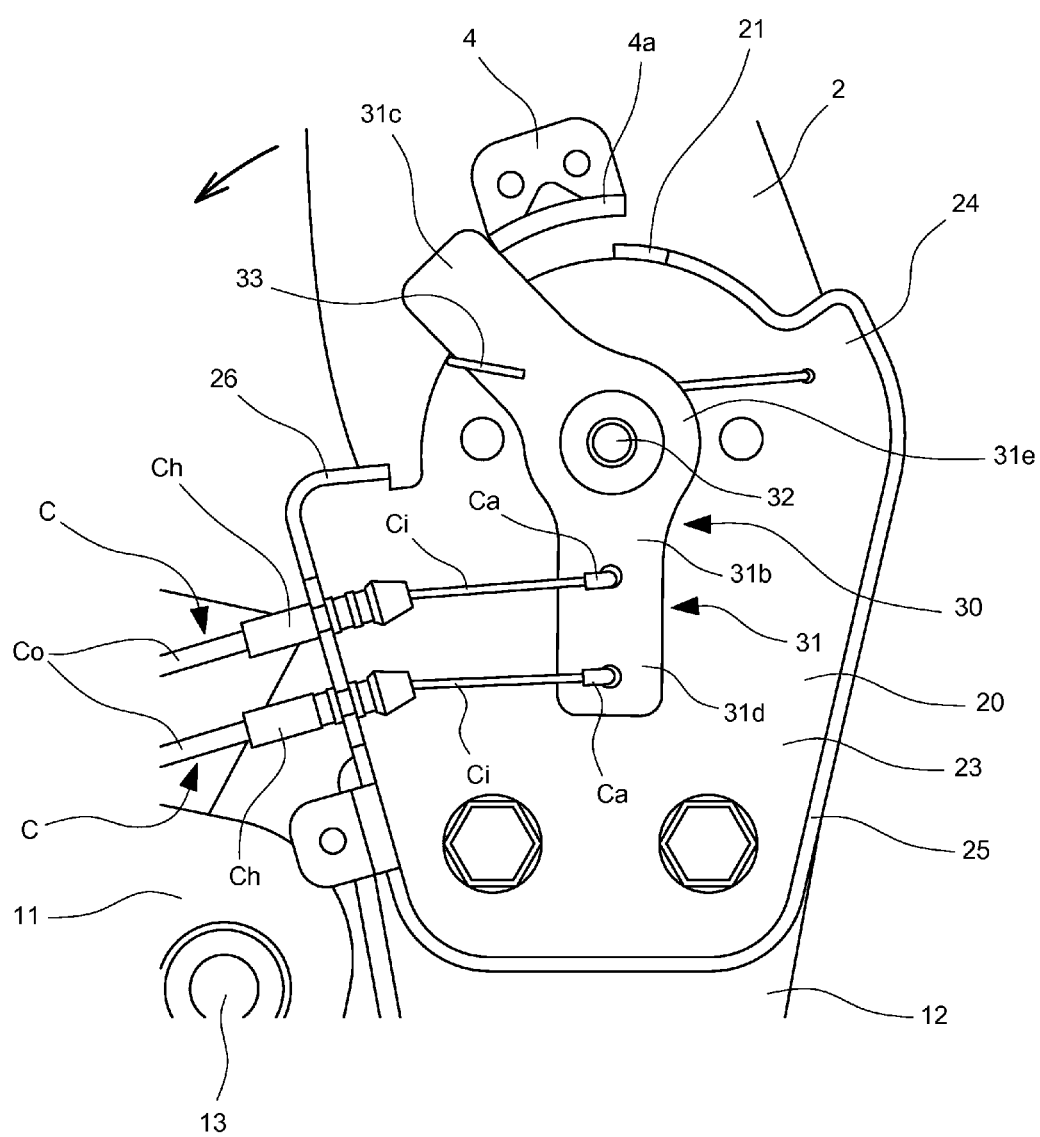
FIG. 9 is a side view diagram illustrating a state where the link mechanism is in operation.
Figure 10:
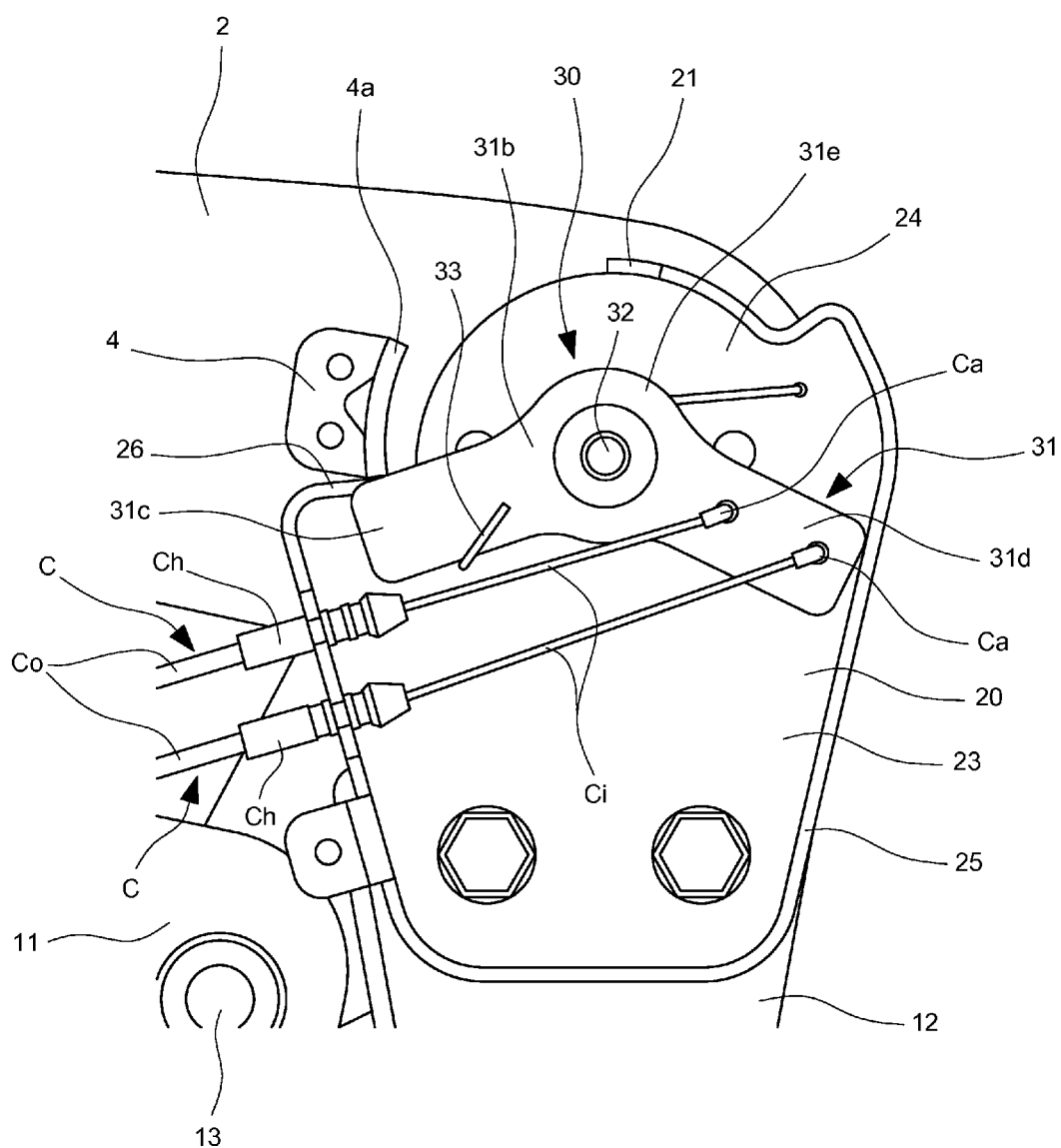
FIG. 10 is a side view diagram illustrating a state where the operation of the link mechanism is completed.

FIGS. 8 to 9 are diagrams illustrating an operation example of a link mechanism which is operated to stow the vehicle seat. Specifically, FIG. 8 is a diagram illustrating a state before the link mechanism is operated and is an enlarged view of the range Y of FIG. 2. FIG. 9 is a diagram illustrating a state where the link mechanism is in operation and is an enlarged view of the range Y in FIG. 3. FIG. 10 is a diagram illustrating a state where the operation of the link mechanism is completed and is an enlarged view of the range Y in FIG. 4.

Figure 11:
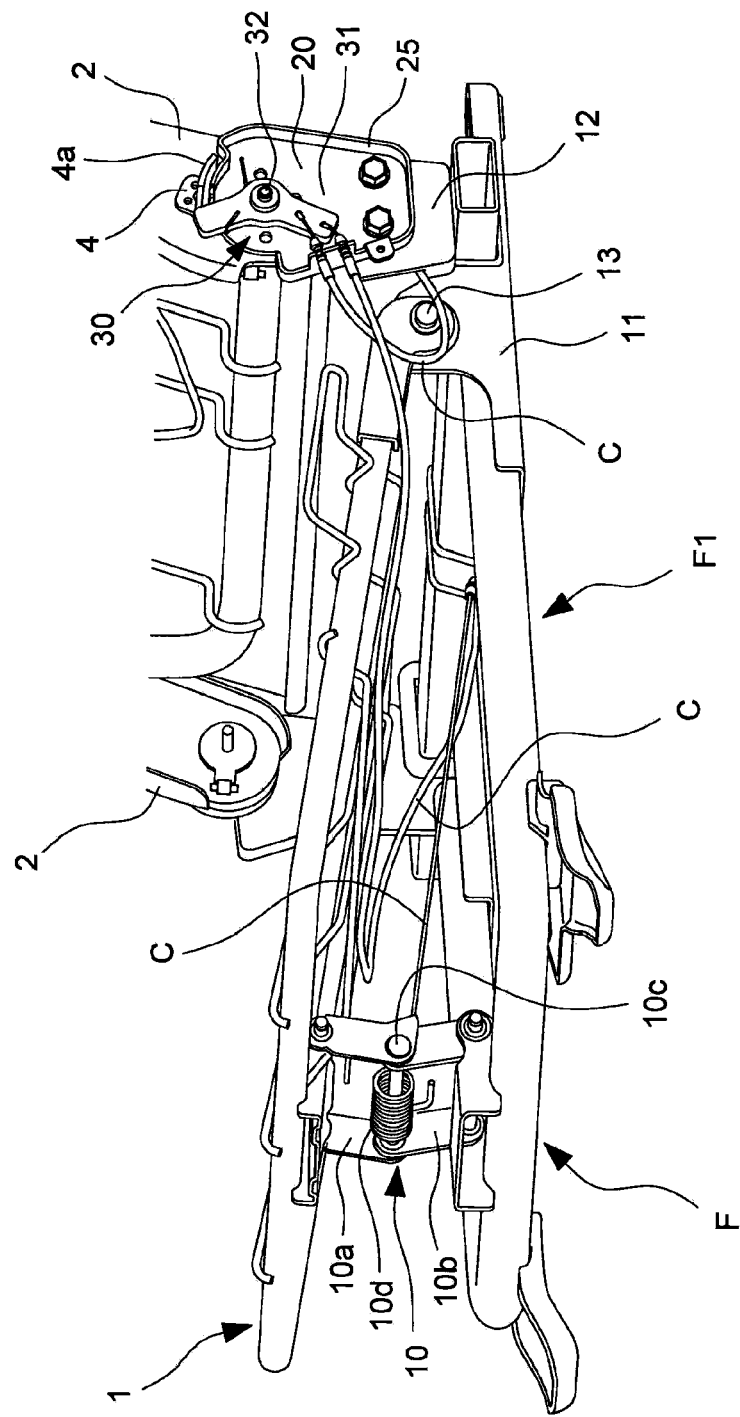
FIG. 11 is a perspective view diagram illustrating a configuration of the link mechanism according to the embodiment of the present invention.
Figure 12:
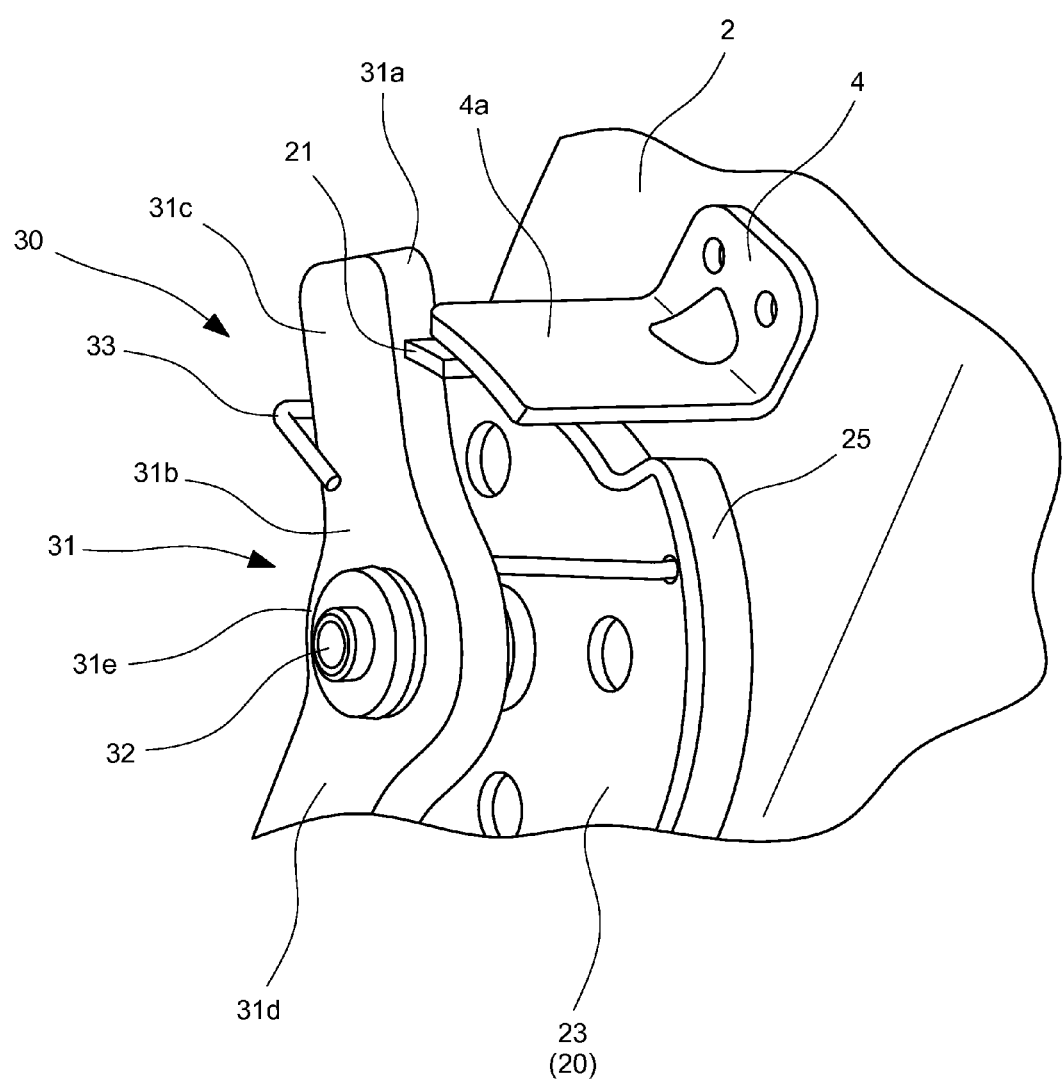
FIG. 12 is a perspective view diagram illustrating a periphery of a projecting portion which is projected from a side portion of a seat back.
Figure 13:
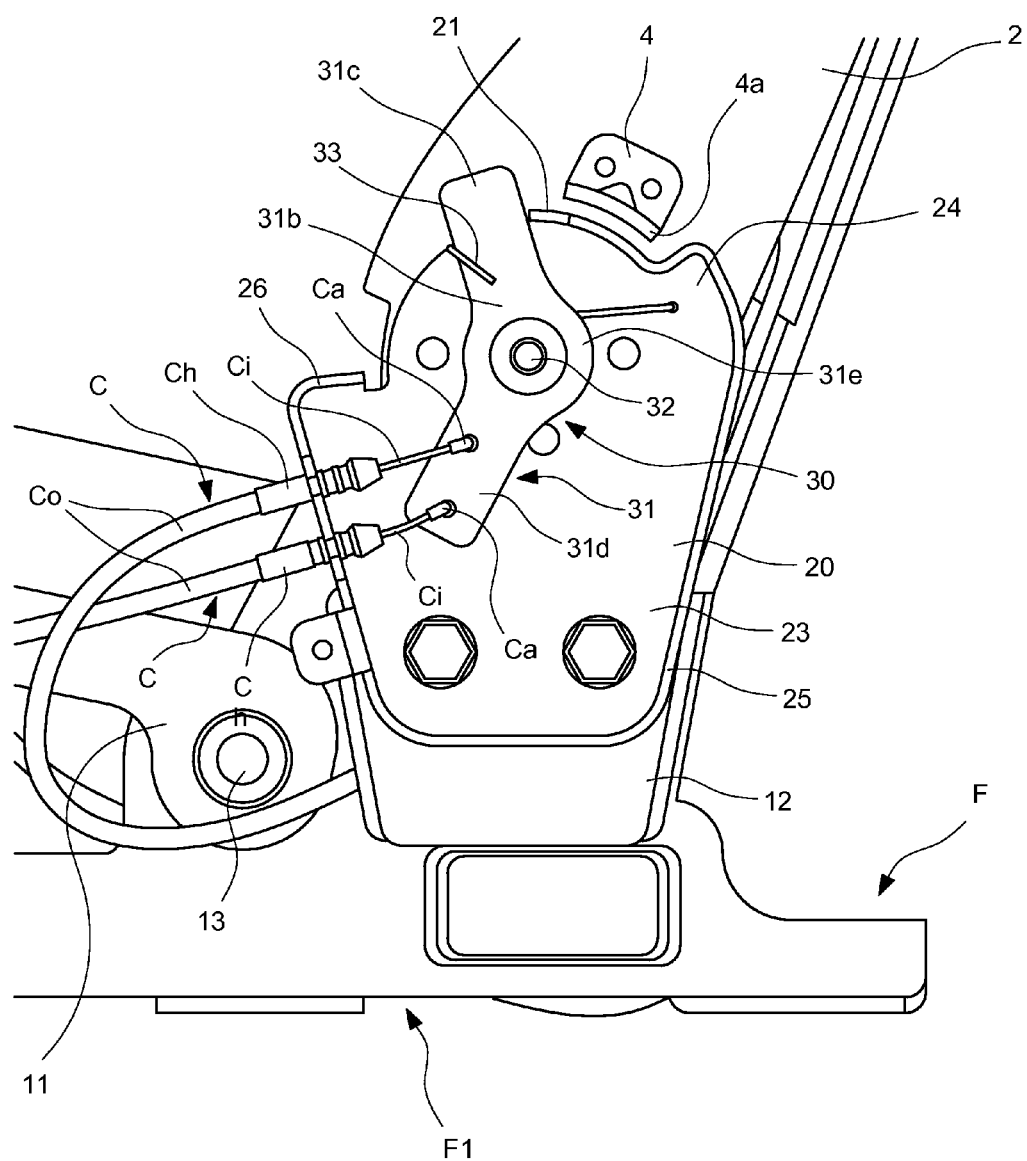
FIG. 13 is a side view diagram when the link mechanism according to the embodiment of the present invention is seen from the side.
Figure 14:
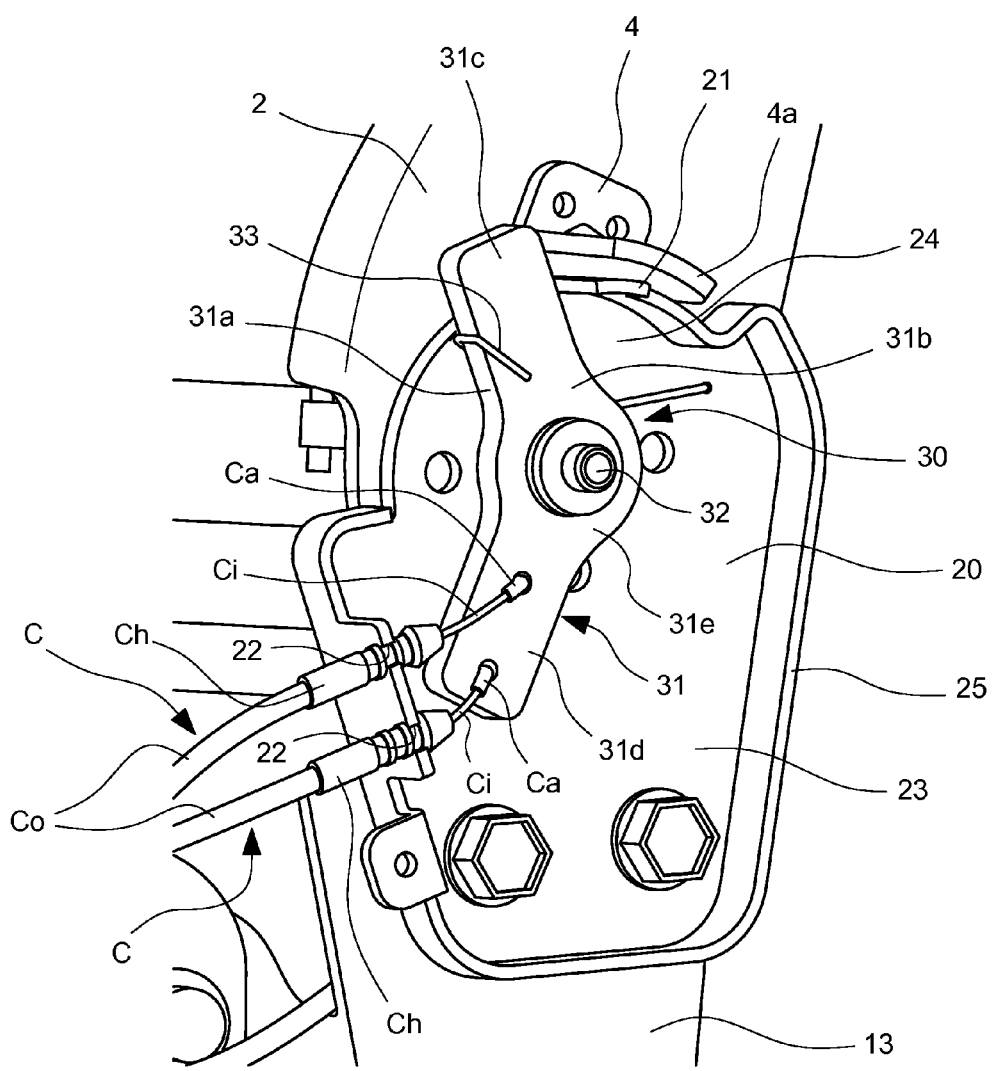
FIG. 14 is a perspective view diagram illustrating a connection of a driving transmission cable according to the embodiment of the present invention.
Figure 15:
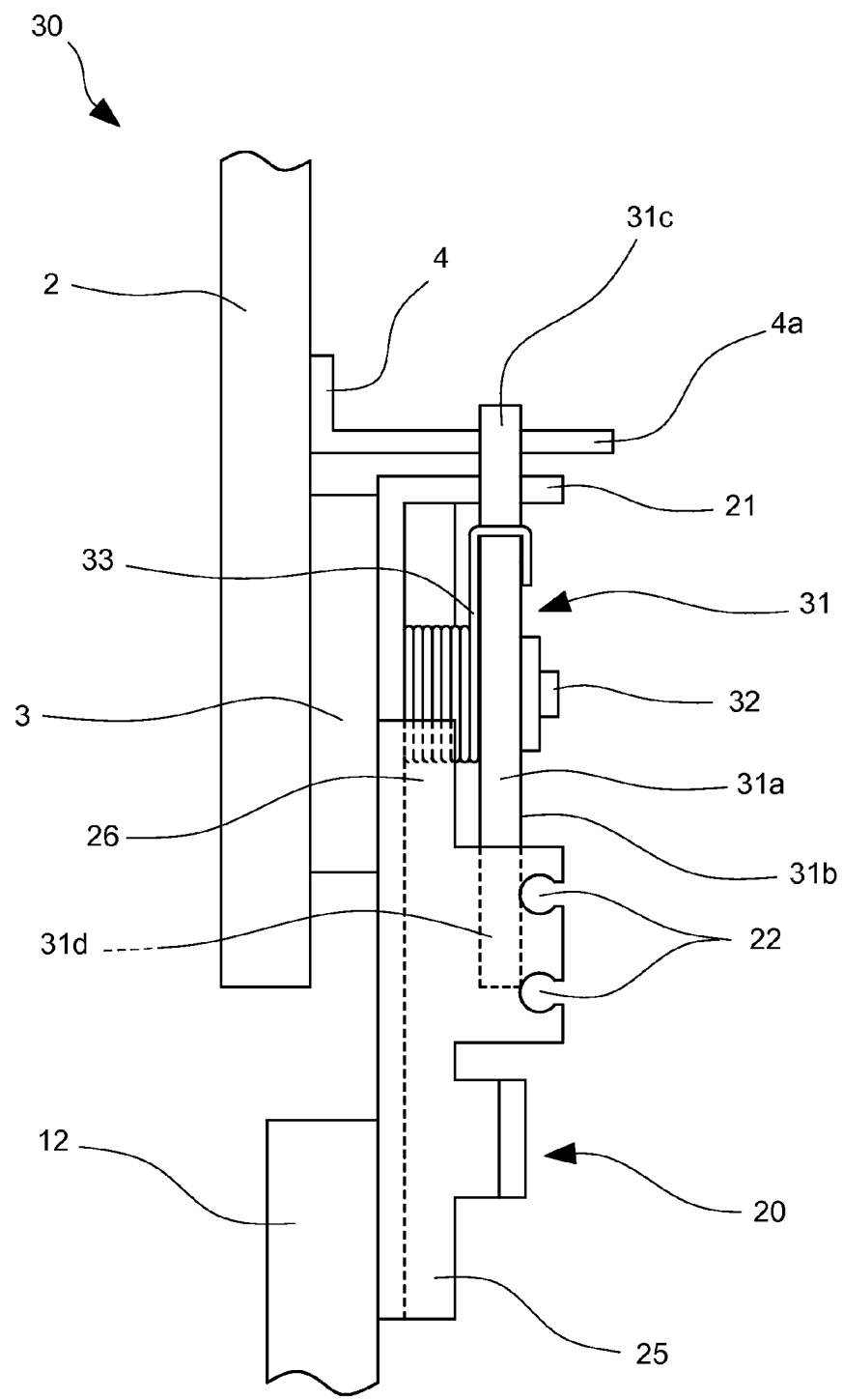
FIG. 15 is a front view diagram when the link mechanism according to the embodiment of the present invention is seen from the front side.

FIGS. 11 to 15 are explanation diagrams illustrating the link mechanism according to the embodiment. FIG. 11 is a perspective view illustrating a configuration of the link mechanism, FIG. 12 is a diagram illustrating a periphery of a projecting portion projecting from a side portion of a seat back, FIG. 13 is a diagram when the link mechanism is seen from the side, FIG. 14 is a diagram illustrating a connection of a driving transmission cable, and FIG. 15 is a diagram when the link mechanism is seen from the front side.

Furthermore, in the description below, the front-back direction of the vehicle seat means the front-back direction of the vehicle, and corresponds to the traveling direction of the vehicle. Further, the width direction of the vehicle seat means the width direction of the vehicle (hereinafter, also referred to as the "vehicle width direction"), and corresponds to the transverse direction relative to the vehicle front. Hereinafter, the locations or the positions of the respective members when the vehicle seat is in the upright position will be described, unless otherwise stated.

The vehicle seat (hereinafter, simply referred to as the "seat") S according to an embodiment of the present invention is mounted as, for example, a rear seat of a vehicle, and includes a seat body H and a foot mechanism F as illustrated in FIG. 1. The foot mechanism F includes a frame body F1 which is positioned at the lower position of the seat body H. When the frame body F1 is fixed to the vehicle body floor, the seat body H which is placed on the frame body F1 is fixed to the vehicle body floor.

Further, the seat body H includes a seat cushion H1 on which a passenger sits, a seat back H2 which supports the passenger from the back side, and a head rest H3 which supports a head portion of the passenger, as components. The respective structures of the seat cushion H1, the seat back H2, and the head rest H3 are commonly known. For example, the seat cushion H1 is formed by placing a cushion body (not illustrated) on a seat cushion frame 1 illustrated in FIG. 11.

Further, as illustrated in FIG. 11, the front end portion of the seat cushion frame 1 is attached to the frame body F1 through a driving unit 10 to be described later. The rear end portion of the seat cushion frame 1 is supported by an attachment bracket 11 which is welded to the rear end portion of the frame body F1. More specifically, the first attachment bracket 11 includes a portion which protrudes above the upper end portion of the frame body F1, and a rotation shaft 13 which is provided along the vehicle width direction is attached to the portion. Further, the rear end portion of the seat cushion frame 1 is rotatably supported by the first attachment bracket 11 through the rotation shaft 13.

The seat back H2 includes a pair of side frames 2 in the frame as illustrated in FIG. 11. The pair of side frames 2 is provided in the seat back H2 while being separated from each other in the vehicle width direction. The lower end portion of the side frame 2 is attached to the second attachment bracket 12 which is welded to the rear end portion of the frame body F1. More specifically, the second attachment bracket 12 projects from the first attachment bracket 11 to extend upward. Meanwhile, the side frame 2 of the seat back H2 is positioned slightly above the upper end portion of the second attachment bracket 12. Further, a connection bracket 20 is disposed between the upper end portion of the second attachment bracket 12 and the lower end portion of the side frame 2.

The connection bracket 20 corresponds to the connection member of various embodiments of the present invention, and is positioned at the side of the second attachment bracket 12 and the side frame 2 in the vehicle width direction to connect the second attachment bracket 12 to the side frame 2. More specifically, the lower end portion of the connection bracket 20 is fixed to the upper end portion of the second attachment bracket 12 by a bolt. The upper end portion of the connection bracket 20 is attached to the lower end portion of the side frame 2 through a reclining mechanism 3 which is provided between the side frame 2 and the connection bracket 20.

Furthermore, the reclining mechanism 3 is attached to the lower end portion of the side frame 2 to rotatably support the seat back H2, and the structure thereof is substantially the same as that of the reclining mechanisms in the related art. That is, the reclining mechanism 3 includes a reclining mechanism body (not illustrated) which is driven when rotating the seat back H2 and a bottomed cylindrical housing 3a which stows the reclining mechanism body.

In a state where the connection bracket 20 is disposed at the side of the seat back H2 and the seat cushion H1 in the vehicle width direction as described above, the connection bracket 20 is attached to the side frame 2 and the second attachment bracket 12. Accordingly, the connection bracket 20 connects the seat back H2 which includes the side frame 2 to the seat cushion H1 which is rotatably supported by the second attachment bracket 12.

The seat S according to this embodiment is formed to be stowable. The seat is in the upright state as illustrated in FIG. 2 when the seat is in use, and is folded as illustrated in FIG. 4 when the seat is not in use.

More specifically, when the seat S is in the upright state, the seat cushion H1 and the seat back H2 form a substantially L-shape when seen from the vehicle width direction, and the head rest H3 is in the upright state above the seat back H2. In this case, the seat cushion H1 is positioned at the use position illustrated in FIG. 2. At the use position, the front end portion of the seat cushion H1 is positioned slightly above the rear end portion thereof, and is positioned slightly above the frame body F1 of the foot mechanism F to be separated from the frame body F1.

When the seat S is stowed, as illustrated in FIG. 3, the seat back H2 rotates relative to the seat cushion H1 in the direction in which the seat back H2 is tilted forward and the head rest H3 rotates relative to the seat back H2 to be turned to the front of the upper end portion of the seat back H2. Further, the seat cushion H1 shifts from the use position toward the stowage position illustrated in FIG. 4. When the seat cushion H1 reaches the stowage position, the front and rear end portions are positioned substantially at the same height, and positioned slightly closer to the frame body F1 of the foot mechanism F than the case where the seat cushion is positioned at the use position.

When the seat S finally reaches the complete stowage state, the seat back H2 may be folded on the seat cushion H1 as illustrated in FIG. 4, so that the head rest H3 is disposed at the front position of the seat cushion H1.

When the seat S is stowed as described above, the respective portions of the seat body H, that is, the seat cushion H1, the seat back H2, and the head rest H3, are operated to be shifted from the state illustrated in FIG. 2 to the state illustrated in FIGS. 3 and 4. Furthermore, to start the stowage of the seat S, the passenger operates an operating unit (not illustrated) provided in the seat body H.

Further, in this embodiment, when the passenger operates the operating unit, the seat back H2 rotates toward the seat cushion H1 through the operating force to be tilted forward, and the head rest H3 and the seat cushion H1 are operated along with the operation, respectively.

Specifically, in this embodiment, each of the seat cushion H1 and the head rest H3 is provided with a driving unit. The driving unit corresponds to the another movable member of the present invention, and is interlocked with the seat back H2 which rotates in the direction to tilt toward the seat cushion H1, so that the corresponding member of the seat cushion H1 and the head rest H3 is shifted toward the position when the seat is stowed.

Further, in this embodiment, a link mechanism 30 which interlocks the driving unit with the rotating seat back H2 is provided. More specifically, the link mechanism 30 transmits a driving force which is generated when the seat back H2 rotates to be tilted forward to each of the driving unit 10 for the seat cushion H1 and the driving unit (not illustrated) for the head rest H3.

In the description below, a configuration which transmits a driving force from the seat back H2 side toward the driving unit 10 for the seat cushion H1 will be described as a description for the aforementioned link mechanism 30. Since the configuration which transmits a driving force from the seat back H2 to the driving unit for the head rest H3 is substantially the same as the configuration which transmits the driving force from the seat back H2 to the driving unit 10 for the seat cushion H1, the description thereof will not be repeated. Furthermore, as the driving unit for the head rest H3, a unit in the related art which drives the head rest H3 by the rotation of the seat back H2 may be used. For example, a mechanism which is disclosed in Japanese Patent Document No. 2010-105655 may be used.

First, the driving unit 10 for the seat cushion H1 will be described. The driving unit 10 is disposed below the seat cushion H1, and may be bent and extended. More specifically, the driving unit 10 is a hinge-like unit as illustrated in FIGS. 5 to 7, in which an upper end portion 10a is rotatably supported by the front end portion of the seat cushion frame 1 and a lower end portion 10b is rotatably supported by the front end portion of the frame body F1 of the foot mechanism F.

Further, one end portion of a driving force transmitting cable C may be connected to the center portion in the vertical direction of the driving unit 10, that is, the portion which corresponds to the origin for when the driving unit 10 is to be folded. In addition, as illustrated in FIG. 11, a spiral spring 10d coils around a hinge shaft 10c. The spiral spring 10d biases a predetermined portion of each of the upper end portion 10a and the lower end portion 10b of the driving unit 10. Because of such a biasing force, the driving unit 10 is maintained in an extended state as long as no external force is applied thereto.

The driving unit 10 with the aforementioned configuration is maintained in the extended state as illustrated in FIG. 5 when the seat S is in use. When the stowage operation of the seat S is started, the end portion which is connected to the driving unit 10 in the driving force transmitting cable C is pulled rearward as illustrated in FIG. 6. Accordingly, since the center portion in the vertical direction of the driving unit 10 is pulled rearward, the driving unit 10 is folded in a transversely V-shape against the biasing force of the spiral spring 10d. Along with the folding operation of the driving unit 10, the seat cushion H1 which is attached to the upper end portion of the driving unit 10 shifts from the use position toward the stowage position.

The driving unit 10 is folded while the upper and lower end portions of the driving unit 10 rotate about the respective support shafts, and finally the driving unit is completely folded as illustrated in FIG. 7. In such a state, the seat cushion H1 reaches the aforementioned stowage position.

The folding operation of the driving unit 10 is started when the end portion connected to the driving unit 10 in the driving force transmitting cable C is pulled rearward. That is, the link mechanism 30 according to this embodiment includes the driving force transmitting cable C as one of the components, and has a configuration in which, when the seat back H2 rotates relative to the seat cushion H1 to tilt forward, one end portion of the driving force transmitting cable C, specifically, the end portion connected to the driving unit 10, is pulled rearward.

Hereinafter, a configuration of the link mechanism 30 according to this embodiment will be described in detail.

As illustrated in FIGS. 8 to 14, the link mechanism 30 according to this embodiment includes an L-shaped bracket 4 and a transmission member 31, in addition to the driving force transmitting cable C. The L-shaped bracket 4 corresponds to a projecting portion of the present invention, and is a sheet metal member which is welded to the lower end portion of the outer surface of the side frame 2. As illustrated in FIG. 12, the L-shaped bracket 4 is formed in a substantially L-shape when seen from the front side of the seat, and includes a projecting portion (hereinafter, the "extension portion") 4a which slightly projects outside in the vehicle width direction of the side frame. When the seat back H2 is rotated, the L-shaped bracket 4 rotates integrally with the seat back H2.

The transmission member 31 corresponds to the rotation body of various embodiments of the present invention, and is a member which rotates to interlock the driving unit 10 with the seat back H2. The transmission member 31 is formed by processing a sheet of metal, and is formed in a substantially V-shape when seen from the vehicle width direction. A center portion 31e of the transmission member 31 is supported by a rotation shaft 32 of the transmission member 31, and rotates in a manner that one end portion 31c is pressed by the seat back H2 rotating in the direction to be tilted toward the seat cushion H1 as illustrated in FIGS. 9 and 10.

More specifically, the rotation shaft 32 extends from the outer end surface of the connection bracket 20 in the vehicle width direction, and is inserted into the hole formed in the center portion of the transmission member 31. Accordingly, the transmission member 31 is rotatably supported by the rotation shaft 32 in a state where the transmission member 31 is disposed at a position adjacent to the connection bracket in the vehicle width direction. In this case, as illustrated in FIG. 13, the end portion which is pressed by the seat back H2 in the transmission member 31 supported by the rotation shaft 32, that is, the one end portion 31c protrudes outside the outer edge of the connection bracket 20 when seen from the vehicle width direction.

When the seat back H2 rotates in the direction to tilt toward the seat cushion H1, the L-shaped bracket 4 abuts from the rear side against the one end portion 31c of the transmission member 31 which protrudes outside the outer edge of the connection bracket 20 as illustrated in FIG. 14. That is, the L-shaped bracket 4 moves to the abutting position against the transmission member 31 along with the rotation of the seat back H2, so that the one end portion 31c of the transmission member 31 is pressed by an extension portion 4a. Accordingly, the transmission member 31 rotates so that the one end portion 31c which protrudes outside the outer edge of the connection bracket 20 is tilted forward.

Furthermore, in this embodiment, since the portion on which the transmission member 31 is pressed by the seat back H2 is formed as the L-shaped bracket 4 which is bent in an L-shape, the rigidity of the portion on which the transmission member 31 is pressed becomes higher compared to the case where the portion is not bent in an L-shape. As a result, in this embodiment, the transmission member 31 may satisfactorily be pressed by the seat back H2.

As described above, in this embodiment, the one end portion 31c of the transmission member 31, that is, the portion pressed by the seat back H2, is positioned outside the outer edge of the connection bracket 20 in order to rotate the transmission member 31 as the rotation body. That is, the transmission member 31 is pressed by the seat back H2 outside the outer edge of the connection bracket 20. Because of such a configuration, in this embodiment, the connection bracket 20 may have a further reduced size.

For easy description, in the configuration in which the seat back H2 presses the transmission member 31 inside the outer edge of the connection bracket 20, a through-hole is formed in the connection bracket 20, and the extension portion 4a of the L-shaped bracket 4 is inserted into the through-hole. Further, there is a need to form the through-hole along the track formed when the L-shaped bracket 4 rotates integrally with the seat back H2. For this reason, when the through-hole is formed in the connection bracket 20, there is a need to further increase the size of the connection bracket 20 to ensure the space for forming the through-hole.

However, in this embodiment, the transmission member 31 is pressed by the seat back H2 outside the outer edge of the connection bracket 20. For this reason, the through-hole is not necessary any more, and hence the connection bracket 20 may have a further reduced size by the degree in which the through-hole is not formed. As a result, in this embodiment, it is possible to effectively suppress the size increase of the seat S.

The structure of the transmission member 31 according to this embodiment will be described in detail. The transmission member 31 is flanged and as illustrated in FIG. 14, a flange portion 31a is formed throughout the entire circumference of the outer edge of the transmission member 31. In other words, the transmission member 31 according to this embodiment includes an outer wall portion 31b that is disposed along the end surface (corresponding to "outer surface"; hereinafter, also referred to "outer end surface") of the connection bracket 20 provided outside in the vehicle width direction, and a flange portion 31a which extends inward from the position adjacent to the outer edge of the outer wall portion 31b toward the outer end surface of the connection bracket 20. In this case, the outer wall portion 31b corresponds to the first wall portion of the present invention, and the flange portion 31a corresponds to the second wall portion according to an embodiment of the present invention.

In this embodiment, as illustrated in FIG. 14, the extension portion 4a of the L-shaped bracket 4 abuts against the flange portion 31a which is formed on the rear side of the one end portion 31c in the transmission member 31. That is, in this embodiment, the portion which is pressed by the seat back H2 in the transmission member 31 is provided in the flange portion 31a. In other words, the one end portion 31c of the transmission member 31 includes a portion which is pressed by the seat back H2 in the transmission member 31. In such a configuration, since the vicinity of the portion which is pressed by the seat back H2 in the transmission member 31 is bent, the rigidity thereof is relatively high. Further, since the rigidity of the portion which is pressed by the seat back H2 is relatively high, the transmission member 31 may stably be pressed by the seat back H2.

Further, since the flange portion 31a is formed throughout the entire circumference of the outer edge of the outer wall portion 31b, the flange portion 31a is formed also at a position adjacent to the portion surrounding the rotation shaft 32 in the outer edge of the outer wall portion 31b. In this way, when the flange portion 31a is formed to be adjacent to the portion positioned around the rotation shaft 32 in at least the outer edge of the outer wall portion 31b, the transmission member 31 may satisfactorily rotate. Accordingly, it is possible to appropriately transmit the rotation of the seat back H2 to the driving unit 10.

As illustrated in FIG. 11, the end portion opposite to the end portion near the driving unit 10 in the driving force transmitting cable C is connected to the other end portion 31d of the transmission member 31. That is, the driving force transmitting cable C corresponds to the relay member, and is laid down to connect the transmission member 31 and the driving unit 10 to each other. When the transmission member 31 is pressed by the seat back H2 and rotated, the other end portion 31d of the transmission member 31 which is connected to the driving force transmitting cable C moves rearward. As a result, the driving force transmitting cable C is pulled rearward, and the driving force is transmitted to the driving unit 10, so that the folding operation is started.

Referring to FIGS. 8 to 10, in this embodiment, the driving force transmitting cable C includes an inner cable Ci which transmits the driving force, an outer cable Co which coats the outside of the inner cable Ci, and an outer casing Ch which is provided in an end portion of the outer cable Co. Further, both end portions of the inner cable Ci protrude from the outer casing Ch to form cable ends Ca.

The driving force transmitting cable C with the aforementioned configuration is laid down between the driving unit 10 and the transmission member 31. Furthermore, in this embodiment, the driving force transmitting cables C of two channels are laid down, in which the driving force transmitting cable C of one channel is laid down between the driving unit 10 for the seat cushion H1 and the transmission member 31 as described above. The driving force transmitting cable C of the other channel is laid down between the driving unit (not illustrated) of the head rest H3 and the transmission member 31. In the description below, only the driving force transmitting cable C which is laid down between the driving unit 10 for the seat cushion H1 and the transmission member 31 will be described.

In the driving force transmitting cable C, the cable end Ca which is formed at one end portion of the inner cable Ci is engaged with the center portion in the vertical direction of the driving unit 10. The cable end Ca which is formed at the other end portion of the inner cable Ci is engaged with the other end portion 31d opposite to the portion pressed by the seat back H2 in the transmission member 31. In this case, the driving force transmitting cable C is drawn along the front-back direction of the seat S for connecting the inner cable Ci to the transmission member 31, to be attached to the end portion of the transmission member 31 from the front side as illustrated in FIG. 13. That is, in this embodiment, the front side of the seat S in the front-back direction corresponds to the upstream of the direction into which the driving force transmitting cable C is drawn when the driving force transmitting cable C is attached to the end portion of the transmission member 31.

The transmission member 31 has a bent structure when seen from the vehicle width direction as described above. In a state where the transmission member 31 is not pressed by the seat back H2, the one end portion 31c and the other end portion 31d of the transmission member 31 are positioned at the front side relative to the center portion 31e as illustrated in FIG. 13. With such a configuration, in this embodiment, the seat S may have a further reduced size. Specifically, when the transmission member 31 is bent as described above, the rotation track of the transmission member 31, more specifically, the area of the passage range of the transmission member 31 becomes smaller than the case where the transmission member 31 has a linear shape. Accordingly, when the transmission member 31 is bent, the space available for the rotation of the transmission member 31 becomes smaller than the case where the transmission member 31 has a linear shape, so that the seat S has a further reduced size.

Furthermore, in this embodiment, an engagement hole which is engaged with the cable end Ca formed in one end portion of the inner cable Ci is formed in the outer wall portion 31b, in the flange portion 31a and the outer wall portion 31b of the transmission member 31 as illustrated in FIG. 14. This is because a space for forming the engagement hole may easily be ensured in the outer wall portion 31b compared to the flange portion 31a. Further, for forming the engagement hole in the flange portion 31a, the flange portion 31a needs to spread in the vehicle width direction. However, for forming the engagement hole in the outer wall portion 31b, the outer wall portion 31b does not need to spread in the vehicle width direction. Accordingly, in this embodiment, the spread amount of the transmission member 31 in the vehicle width direction is suppressed, and hence the seat S may have a further reduced size.

Further, in this embodiment, as described above, the driving force transmitting cable C is attached to the end portion opposite to the portion pressed by the seat back H2, that is, the other end portion 31d in the transmission member 31. As illustrated in FIGS. 13 and 14, an end portion of the coil spring 33 is locked to the end portion on the same side of the portion pressed by the seat back H2, that is, the one end portion 31c in the transmission member 31.

The coil spring 33 corresponds to the biasing member, and is positioned between the transmission member 31 and the connection bracket 20 in the vehicle width direction. More specifically, the coil spring 33 coils around the rotation shaft 32 of the transmission member 31. Further, one end portion of the coil spring 33 is fixed to the connection bracket 20, and the other end portion of the coil spring 33 is hooked by one end portion 31c of the transmission member 31 in a state where the other end portion is formed in a hook shape.

The coil spring 33 with the aforementioned configuration biases the transmission member 31 toward the direction opposite to the direction in which the seat back H2 rotating in the direction to be tilted toward the seat cushion H1 presses the transmission member 31. The one end portion 31c of the transmission member 31 is biased by the biasing force of the coil spring 33 to be tilted rearward, and abuts against a home position defining portion 21 which is provided in the connection bracket 20. In this case, the home position defining portion 21 is a tongue-like protrusion which is provided at the uppermost portion of the connection bracket 20 and extends outward in the width direction as illustrated in FIGS. 8 to 10 and FIGS. 12 to 14. In a state where the one end portion 31c abuts against the home position defining portion 21, the transmission member 31 is positioned at a normal position, that is, a home position.

Furthermore, the abutting position of the transmission member 31 against the home position defining portion 21 corresponds to the position of the transmission member 31 illustrated in FIG. 8 and the home position of the transmission member 31. That is, the transmission member 31 is held at the abutting position against the home position defining portion 21 by the biasing force of the coil spring 33 in a state where the transmission member 31 is not pressed by the seat back H2. In a state where the transmission member 31 is pressed by the seat back H2, the transmission member 31 rotates in the direction in which the one end portion 31c is tilted forward against the biasing force of the coil spring 33.

Further, in this embodiment, the coil spring 33 is attached to the one end portion 31c of the transmission member 31, and the driving force transmitting cable C is attached to the other end portion 31d of the transmission member 31. In this way, since the coil spring 33 and the driving force transmitting cable C are attached to the opposite end portions to each other in the transmission member 31, the respective members are reasonably arranged. In particular, the space around the transmission member 31 may effectively be used. Furthermore, since the rotating direction of the transmission member 31 by the biasing force of the coil spring 33 is opposite to the rotating direction of the transmission member 31 for pulling the driving force transmitting cable C, it is desirable for the attachment position of the coil spring 33 and the attachment position of the driving force transmitting cable C to be separated from each other as much as possible. For this reason, the aforementioned attachment of the coil spring 33 and the driving force transmitting cable C is advantageous.

Further, in this embodiment, both end portions of the coil spring 33 are disposed inside the positions of both end portions of the extension portion 4a of the L-shaped bracket 4 in the vehicle width direction, and are disposed to be stowed within the rotation range when the L-shaped bracket 4 rotates forward together with the seat back H2. In other words, the extension portion 4a of the L-shaped bracket 4 projects outside the outer end portion of the coil spring 33 in the vehicle width direction. Accordingly, for example, it is possible to prevent a situation where the member disposed at the side of the coil spring 33 unexpectedly abuts against the side portion of the coil spring 33 and interferes with the coil spring 33.

Next, a configuration of the connection bracket 20 will be described.

The connection bracket 20 is a steel-plate member which is formed in a substantially fan shape when seen from the vehicle width direction, to connect the seat back H2 to the seat cushion H1 as described above. In this embodiment, the connection bracket 20 supports the transmission member 31, the coil spring 33, and the driving force transmitting cable C, in addition to the aforementioned function.

Specifically, the rotation shaft 32 of the transmission member 31 extends from the outer end surface of the connection bracket 20 in the vehicle width direction, and the connection bracket 20 rotatably supports the transmission member 31 through the rotation shaft 32. Accordingly, the transmission member 31 is disposed at a position adjacent to the connection bracket 20 in the vehicle width direction. Further, in this embodiment, the transmission member 31 is disposed outside in the vehicle width direction compared to a flange portion 25 to be described later formed along the outer edge of the connection bracket 20 as illustrated in FIG. 15.

Furthermore, in this embodiment, the housing 3a of the reclining mechanism 3 is jointed to the inner end surface of the connection bracket 20 in the vehicle width direction. More specifically, holes to which a plurality of protrusions 3b protruding from the housing 3a of the reclining mechanism 3 are fitted are formed in the connection bracket 20, and the protrusions 3b are fitted and welded to the holes so that the connection bracket 20 is jointed to the housing 3a of the reclining mechanism 3. In this way, in this embodiment, the connection bracket 20 is jointed to the housing 3a of the reclining mechanism 3 so that the connection bracket 20 is attached to the seat back H2 through the reclining mechanism 3.

In this embodiment, as illustrated in FIGS. 13 and 14, there are four jointing places between the connection bracket 20 and the reclining mechanism 3, that is, places where the protrusions 3b are fitted and welded to the holes formed in the connection bracket 20 when seen from the vehicle width direction. Further, in this embodiment, the jointing places are disposed remote from each other by a substantially equal distance in the vertical and front-back directions from the installation position of the rotation shaft 32. In other words, the rotation shaft 32 is disposed within a substantially square area which is surrounded by the jointing places when seen from the vehicle width direction. In such a configuration, the rigidity of the portion of the connection bracket 20 surrounded by the jointing places to the reclining mechanism 3 is higher than the rigidity of the other portion, and further, the rotation shaft 32 of the transmission member 31 is provided in the portion. Accordingly, it is possible to further stabilize the support state of the transmission member 31.

In this embodiment, the connection bracket 20 is jointed to the reclining mechanism 3 at four jointing places, but the jointing places may be at least three places or more. Then, the rotation shaft 32 provided within the area surrounded by the jointing places in the connection bracket 20 realizes the aforementioned effect.

Further, the coil spring 33 coils around the rotation shaft 32, in which one end portion is locked to the transmission member 31 and the other end portion is fixed to the connection bracket 20. In addition, the driving force transmitting cable C is provided with, in front of the connection bracket 20, a holding portion 22 to hold the outer casing Ch, as illustrated in FIGS. 14 and 15. A configuration of a holding portion 22 will be described later.

A structure of the connection bracket 20 with the aforementioned operation will be described. The connection bracket 20 includes a substantially inverted trapezoidal lower portion 23 and a substantially semi-circular upper portion 24 when seen from the vehicle width (side) direction. Further, the steel plate which forms the connection bracket 20 is flanged, and the flange portion 25 is formed to protrude outward in the vehicle width direction along the outer edge of the connection bracket 20, excluding a part thereof. That is, the connection bracket 20 according to this embodiment includes an end surface which is provided outside in the vehicle width direction and the flange portion 25 which extends outward in the vehicle width direction from the position adjacent to the outer edge of the end surface. In this case, the flange portion 25 corresponds to the connection member side extension portion.

The flange portion 25 will be described in detail. The flange portion 25 is formed throughout the substantially entire area excluding the portion adjacent to the upper portion 24 in the outer edge of the lower portion 23 of the connection bracket 20. Further, as illustrated in FIG. 11, in the flange portion 25 which is formed in the lower portion 23 side, the portion which is positioned at the front and is positioned at the center portion of the lower portion 23 in the vertical direction protrude slightly outside in the vehicle width direction compared to the other portion. A notch formed in a substantially round hole shape is formed in the protrusion portion.

Further, the outer casing Ch of the driving force transmitting cable C is engaged with the substantially round hole shaped notch. That is, in this embodiment, a part of the flange portion 25 is notched, and the holding portion 22 which holds the driving force transmitting cable C is formed by the notch. In such a configuration, in this embodiment, a member which holds the driving force transmitting cable C does not need to be additionally provided, and hence the structure for holding the driving force transmitting cable C is further simplified.

Further, in the outer edge of the lower portion 23 of the connection bracket 20, a portion at the upper end portion slightly protrudes forward compared to the front end portion of the upper portion 24 as illustrated in FIG. 13, and the flange portion 25 is formed also in such a portion. In the outer edge of the lower portion 23, the flange portion 25 formed in the portion at the upper end portion and positioned forward compared to the upper portion 24 is formed to be substantially horizontal in the front-back direction. Further, the flange portion 25 abuts against the extension portion 4a of the L-shaped bracket 4 when the L-shaped bracket 4 provided in the side frame 2 of the seat back H2 rotates together with the seat back H2 in the direction to be tilted forward. Accordingly, the further rotation of the seat back H2 in the direction to be tilted toward the seat cushion H1 is regulated.

That is, in this embodiment, a part of the flange portion 25 is positioned at the front end portion of the movement range of the L-shaped bracket 4, and abuts against the L-shaped bracket 4 during the rotation of the seat back H2, so that it serves as a rotation regulating portion 26 which regulates the further rotation of the seat back H2. In this way, in this embodiment, there is no need to additionally provide a member which regulates the rotation amount of the seat back H2, and hence the structure for regulating the rotation of the seat back H2 is further simplified.

The flange portion 25 will be further described in detail. In the outer edge of the upper portion 24 of the connection bracket 20, the flange portion 25 is not formed at the front half portion, and the flange portion 25 is formed at the rear half portion. In this case, in the flange portion 25 which is formed at the rear half of the outer edge of the upper portion 24, the portion which is positioned at the foremost side protrudes slightly outward in the vehicle width direction compared to the other portion. The protrusion portion forms the aforementioned home position defining portion 21, and abuts against the one end portion 31c of the transmission member 31 rotating in the direction to be laid rearward by the biasing force of the coil spring 33 in a state where the transmission member 31 is not pressed by the seat back H2.

As described above, in the outer edge of the upper portion 24 of the connection bracket 20, the flange portion 25 is not formed at the front half portion. In this case, in the outer edge of the upper portion 24 of the connection bracket 20, the range where the flange portion 25 is not formed and the range where the one end portion 31c of the transmission member 31 passes when the transmission member 31 is rotated almost overlap with each other. Accordingly, in this embodiment, it is possible to effectively prevent a situation where one end portion 31c of the transmission member 31 unexpectedly collides against the flange portion 25 when the transmission member 31 is rotated and interferes with the rotation of the transmission member 31. Such an effect will be described in detail with reference to FIGS. 8 to 10.

When the transmission member 31 supported by the rotation shaft 32 is seen from the vehicle width direction, as illustrated in FIG. 8, only the distal end portion of the one end portion 31c of the transmission member 31 is protruded outside the outer edge of the upper portion 24 of the connection bracket 20, and the other portion of the transmission member 31 is positioned inside the outer edge of the connection bracket 20. In a state where the transmission member 31 is not pressed by the seat back H2, that is, the transmission member 31 is positioned at the home position, the one end portion 31c of the transmission member 31 is positioned within the range where the flange portion 25 is not provided in the outer edge of the upper portion 24 of the connection bracket 20. More specifically, within the range where the flange portion 25 is not provided, the one end portion 31c of the transmission member 31 is positioned at the rearmost region.

When the transmission member 31 is pressed by the seat back H2 to rotate, the one end portion 31c of the transmission member 31 moves along the range where the flange portion 25 is not provided as illustrated in FIG. 9. Then, when the rotation of the seat back H2 is regulated by the rotation regulating portion 26, the transmission member 31 passes through the range where the flange portion 25 is not provided as illustrated in FIG. 10, and faces the portion forming the rotation regulating portion 26 in the flange portion 25. More specifically, one end portion 31c of the transmission member 31 is positioned outside the rotation regulating portion 26 in the width direction, and comes to the point where the rotation regulating portion 26 is disposed.

As described above, in this embodiment, in the outer edge of the outer end surface of the connection bracket 20, the flange portion 25 is not formed in the most part of the range where the one end portion 31c of the transmission member 31 passes when the transmission member 31 is rotated. For this reason, it is possible to effectively prevent a situation where the flange portion 25 unexpectedly collides against the transmission member 31 and interferes with the rotation of the transmission member 31.

Furthermore, in this embodiment, the transmission member 31 is disposed outside in the vehicle width direction compared to the flange portion 25 formed in the connection bracket 20 as illustrated in FIG. 15, but the aforementioned effect is facilitated as the transmission member 31 is located closer to the outer end surface of the connection bracket 20. That is, the interference of the transmission member 31 with the flange portion 25 is facilitated as the arrangement position of the transmission member 31 is located closer the connection bracket 20 in the vehicle width direction. In such a configuration, as long as the flange portion 25 is not provided in at least a part of the range where the one end portion 31c of the transmission member 31 passes when the transmission member 31 is rotated, it is possible to effectively prevent the interference between the transmission member 31 and the flange portion 25.

Further, in this embodiment, the one end portion 31c and the other end portion 31d of the transmission member 31 do not abut against the connection bracket 20 as long as the extension portion 4a of the L-shaped bracket 4 abuts against the portion forming the rotation regulating portion 26 in the flange portion 25 to regulate the rotation of the seat back H2. However, the invention is not limited thereto. For example, the portion at the rear side in the flange portion 25, particularly, the portion formed at the rear upper portion of the outer edge of the lower portion 23 may protrude outward in the vehicle width direction compared to the other portion to abut against the transmission member 31. Further, in the configuration in which the other end portion 31d of the transmission member 31 abuts against the portion protruding at the rear side in the flange portion 25, when the rotation of the seat back H2 is regulated, that is, the transmission member 31 reaches the position illustrated in FIG. 7, the further rotation of the transmission member 31 may be regulated by the flange portion 25.

The aforementioned embodiment is merely an example that is provided to help understanding of the present invention, and does not limit the scope of the invention. The present invention may be modified or improved without departing from the spirit thereof and the present invention, of course, includes the equivalent thereto. Further, the aforementioned material, shape, and the like are merely examples for exhibiting the effect of the present invention, and do not limit the scope of the invention.

Further, in the aforementioned embodiment, the driving unit 10 of the seat cushion H1 is exemplified as another movable member interlocked with the seat back H2 through the operation of the link mechanism 30. However, a configuration in which a member that is operated when the seat is stowed in the member provided in the seat S or a driving mechanism that drives the member serves as another movable member may also be employed.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. A vehicle seat comprising:
   a seat cushion;
   a seat back which rotates relative to the seat cushion; and
   a link mechanism which interlocks another movable member with the seat back when it rotates in a tilting direction toward the seat cushion;
   the seat back and the seat cushion being connected to each other by a connection member disposed at a side of the seat back and the seat cushion in a width direction of the vehicle seat;
   the link mechanism including a rotation body which rotates to interlock the another movable member with the seat back when it rotates in the tilting direction toward the seat cushion;
   the rotation body being adjacent to the connection member in the width direction and rotating by being pressed by the seat back when it rotates in the tilting direction toward the seat cushion;
   a portion pressed by the seat back in the rotation body being positioned outside of an outer edge of the connection member when seen from the width direction;
   the seat back includes a projecting portion which projects outward in the width direction;
   when the seat back rotates in the tilting direction toward the seat cushion, the projecting portion moves to an abutting position against the rotation body and presses the rotation body;
   the connection member includes an outer surface which is provided outside in the width direction and a connection member side extension portion which extends from a position adjacent to an outer edge of the outer surface outward in the width direction; and
   a part of the connection member side extension portion is positioned at a front end portion of a movement range of the projecting portion and abuts against the projecting portion to regulate further rotation of the seat back in the tilting direction toward the seat cushion.

2. The vehicle seat according to claim 1, wherein:
   the rotation body includes:
     a first wall portion which is disposed along an outer surface of the connection member provided outside thereof in the width direction; and
     a second wall portion which extends from a position adjacent to an outer edge of the first wall portion toward the outer surface;
   the portion pressed by the seat back in the rotation body is provided in the second wall portion; and
   the second wall portion is provided at a position adjacent to a portion surrounding a rotation shaft of the rotation body in at least the outer edge of the first wall portion.

3. The vehicle seat according to claim 1, wherein the rotation body has a bent shape when seen from the width direction.

4. The vehicle seat according to claim 3, wherein:
   a center portion of the rotation body is supported by the rotation shaft of the rotation body;
   one end portion of the rotation body includes the portion pressed by the seat back in the rotation body;
   a relay member which is laid down to connect the rotation body to the another movable member is attached to an other end portion of the rotation body; and
   in a state where the rotation body is not pressed by the seat back, the one end portion and the other end portion of the rotation body are positioned at a front side of the vehicle seat in a front-to-back direction relative to the center portion of the rotation body.

5. The vehicle seat according to claim 1, wherein:
   the portion pressed by the seat back in the rotation body is included in one end portion of the rotation body;
   the one end portion of the rotation body protrudes outside the outer edge of the connection member when seen from the width direction;
   the connection member includes an outer surface which is provided outside in the width direction and a connection member side extension portion which extends from a position adjacent to an outer edge of the outer surface outward in the width direction;
   the connection member side extension portion is provided along the outer edge of the outer surface; and
   in the outer edge of the outer surface, the connection member side extension portion is notched in at least a part of a range where the one end portion of the rotation body passes when the rotation body rotates.

6. The vehicle seat according to claim 1, wherein:
   a center portion of the rotation body is supported by a rotation shaft of the rotation body;
   a biasing member which biases the rotation body toward the direction opposite to the direction in which the seat back rotates in the tilting direction toward the seat cushion and presses the rotation body, and is attached to one end portion of the rotation body; and
   a relay member which is laid down to connect the rotation body to the another movable member is attached to an other end portion of the rotation body.

7. The vehicle seat according to claim 1, wherein:
the connection member includes an outer surface which is provided outside in the width direction and a connection member side extension portion which extends from a position adjacent to an outer edge of the outer surface outward in the width direction; and
a holding portion which holds a relay member laid down to connect the rotation body to the another movable member is formed by notching a part of the connection member side extension portion.

8. The vehicle seat according to claim 1, wherein:
by connecting the connection member to a reclining mechanism provided between the connection member and the seat back in the width direction, the connection member is attached to the seat back through the reclining mechanism,
the connection member and the reclining mechanism are connected to each other at least at three or more connecting places therebetween when seen from the width direction, and
a rotation shaft of the rotation body is disposed in an area surrounded by the connecting places when seen from the width direction.

9. The vehicle seat according to claim 2, wherein the rotation body has a bent shape when seen from the width direction.

* * * * *